United States Patent [19]
Harhay et al.

[11] Patent Number: 6,035,752
[45] Date of Patent: Mar. 14, 2000

[54] SCRAP CUTTER ASSEMBLY

[75] Inventors: David E. Harhay, Uniontown; Richard A. Mackey, Massillon, both of Ohio

[73] Assignee: Akron Steel Fabricators Co., Inc., Akron, Ohio

[21] Appl. No.: 09/105,358

[22] Filed: Jun. 26, 1998

Related U.S. Application Data

[62] Division of application No. 08/676,036, Jul. 5, 1996, Pat. No. 5,896,795.

[51] Int. Cl.⁷ .................................................. B26D 7/06
[52] U.S. Cl. .................................. 83/111; 83/129; 83/134; 83/140; 83/143; 83/923
[58] Field of Search .............................. 83/134, 138, 150, 83/923, 111, 129, 131, 140, 143

[56] References Cited

U.S. PATENT DOCUMENTS

| | | | |
|---|---|---|---|
| 760,303 | 5/1904 | Boykin | 83/134 |
| 2,786,527 | 3/1957 | Bruns | 83/923 |
| 3,013,458 | 12/1961 | Arvidson | 83/134 |
| 3,186,279 | 6/1965 | Rengel | 83/694 |
| 4,389,868 | 6/1983 | Strout | 83/150 |
| 4,449,801 | 5/1984 | Reba et al. | 83/99 |

*Primary Examiner*—M. Rachuba
*Attorney, Agent, or Firm*—Reese Taylor

[57] ABSTRACT

A scrap cutting assembly for use in a reciprocating press in which a cutter is carried on a ram which reciprocates with respect to a fixed base to form and cut material passing through the press includes an exit plate mounted on the press base adjacent the material exit point and a shutter spring and backing spring attached to the exit plate. The exit plate has a tapered bottom surface which tapers upwardly toward the ram and the shutter spring and backing spring are attached to and lie along the bottom tapered surface with one end of the shutter spring extending beyond the end of the exit plate and slightly above the top surface thereof so as to support the material as it is fed through the press. The shutter spring is depressed by the cutter as the ram and cutter descend to sever the material.

4 Claims, 3 Drawing Sheets

SCRAP CUTTER ASSEMBLY

This application is a divisional of application Ser. No. 08/676,036, filed on Jul. 5, 1996, now U.S. Pat. No. 5,896,795.

RELATED PATENT APPLICATIONS

None.

FIELD OF THE INVENTION

This invention relates in general to metal forming and relates in particular to the handling of scrap formed as a sheet or coil of material is passed through a reciprocating press with various workpieces being stamped from the material. More specifically, the invention relates to an assembly for handling the scrap as it is guided over a scrap cutter blade as it exits the press.

BACKGROUND OF THE INVENTION

In the art of metal forming and, as an example, the art of metal container forming, material is fed into a reciprocating press, either in sheet form or from a coil. The press reciprocates and tooling carried by the upper and lower members of the press cooperate to stamp or blank out and subsequently form various articles from the sheet of material which is usually metal and, especially in the container industry, quite thin on the order of 0.010" thick.

One of the continuing goals in the industry is to reduce the metal thickness so far as possible for economic reasons. Another object common to the industry is to increase speed and to thus obtain more finished products for each cycle of the press. Finally, the presses, particularly, again, in the container industry, have multiple sets of tooling, and these are disposed so as to make maximum use of the material, leaving only a very minimal amount of unused material. The result is to form a sheet of scrap which is sometimes referred to as a "skeleton" which is a very flimsy piece of material having a plurality of holes in it and consisting of extremely narrow interconnecting pieces of material.

This material is moved through the press during operations at relatively high speeds, of course, and ultimately exits at one end. As is common in the prior art, the material is then cut for further disposition, such as recycling or disposal.

As described more specifically in the following specification, the prior art generally includes a cutter blade on the reciprocating ram and a complemental cutter edge mounted on the base. The ram, as it reciprocates and forms the material, also cuts the scrap into pieces as the end of the sheet exits the press. Opposite the ram-mounted cutter is, conventionally, a backup member which is spring mounted and, in the prior art, as the press reciprocates, this member is depressed as the cutter comes down and springs back to its original position under the force of the spring. Galling often occurs as the backup member reciprocates within a bore in the press base in response to forces from the ram. This constant movement requires lubrication of the backup member as it moves up and down. Furthermore, there is a tendency to break off the head of the bolts holding the backup member after a period of use. Finally, this arrangement is subject to spring wear and ultimate failure.

The current solution to problems caused by the damage or failure of the components of the backup member above noted is to virtually disassemble the top portion of the base in order to replace the backup member or the failed component.

Accordingly, it is believed desirable to provide a cutter assembly which can be retrofit onto existing presses or provided as original equipment which is faster, less expensive and requires less or at least easier maintenance than the existing prior art.

SUMMARY OF THE INVENTION

It accordingly becomes the principal object of this invention to provide a scrap cutter assembly which can be either retrofit onto existing press bases or provided as original equipment and which permits high-speed press operation, minimizing the shimmying and movement of the "skeleton" as it moves across the press and which is virtually maintenance free and, in the event of failure, is quite easily replaceable or repairable.

In furtherance of the above-identified object of the invention, it has been found that an assembly can be provided with a modified exit plate which has a tapered bottom surface extending upwardly toward the reciprocal ram and outward toward the press exit. Affixed to the modified exit plate is a shutter spring which is an elongate, flat spring member which lies along the tapered lower surface of the exit plate and extends beyond it to underlie the cutter carried by the upper ram. Due to the taper of the bottom surface of the exit plate, the exposed or extended end of the shutter spring is normally disposed slightly above the top surface of the exit plate.

To enhance the stability and life of the shutter spring, it has been found that the backing spring can be juxtaposed beneath the shutter spring and also affixed to the exit plate to provide further support for the shutter spring during its deflection with a smooth, relatively long radius and to assist it in springing back to its starting position after having been deflected by the cutter carried by the reciprocal ram.

Accordingly, production of an improved scrap cutter assembly of the character above described becomes the principal object of this invention with further objects thereof becoming more apparent upon a reading of the following specification considered and interpreted in view of the accompanying drawings.

BRIEF DESCRIPTION OF THE PREFERRED EMBODIMENTS

Figure 1:
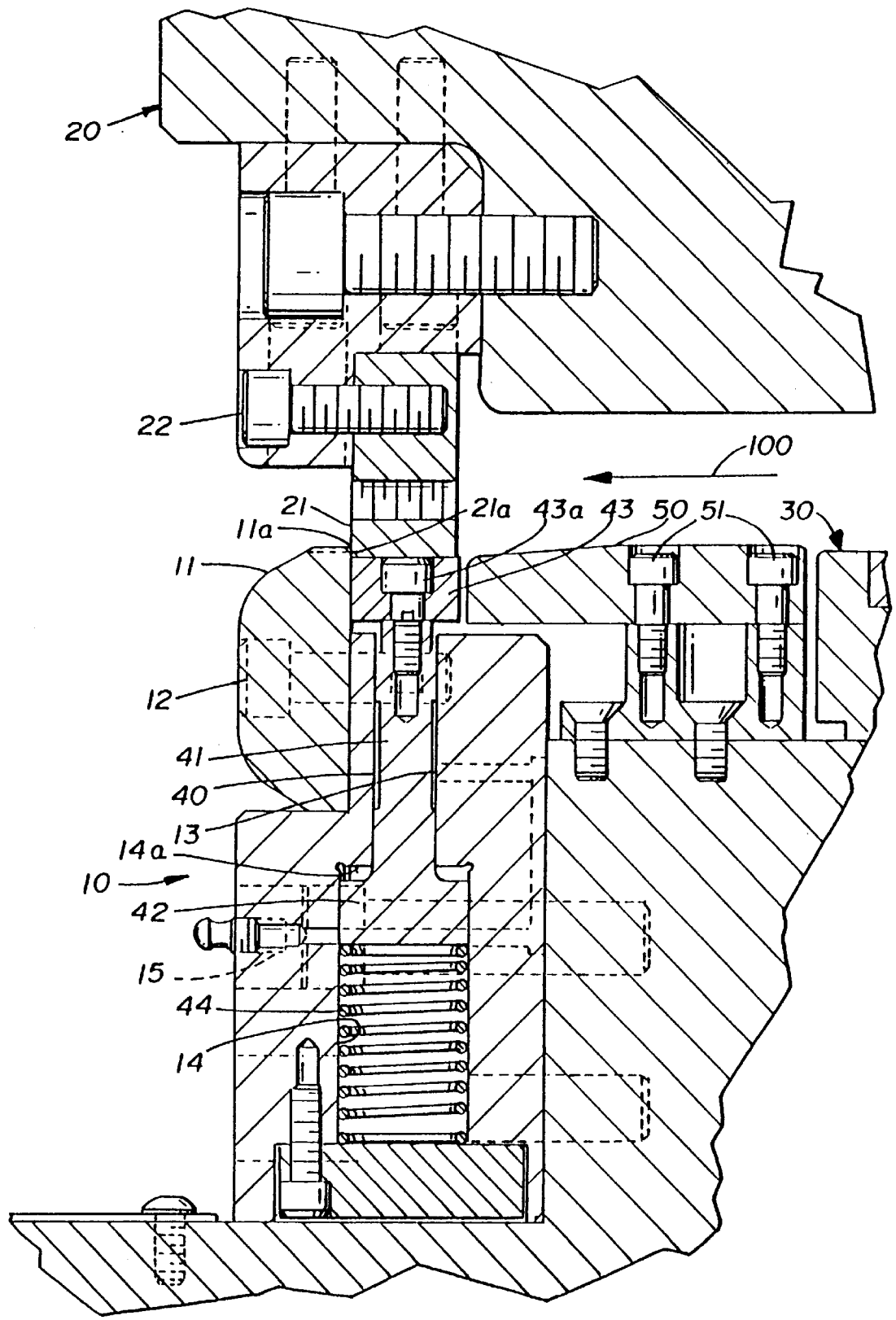
FIG. 1 is an elevational view, partially in section, showing the prior art.

Referring first to FIG. 1 of the drawings, an exemplary prior art structure is illustrated. This view is a partial elevational view showing the main components of the prior art which will be readily understood by those of ordinary skill in the metal-forming art.

To that end, a base 10 is provided and a reciprocating ram 20 is also provided. The ram 20 moves toward and away from the base 10 in a manner well known in the art.

In FIG. 1 of the drawings, it will be assumed that one of ordinary skill in this art will appreciate that tooling for preforming the various blanking and forming operations on the metal is disposed to the right of FIG. 1, and that tooling is carried by the ram 20 and the base 10. A partial view of the lower portion of such tooling can be seen as designated by the numeral 30 in the drawings. No further detailed explanation or description of the tooling 30 will be presented inasmuch as its precise nature will obviously vary depending on the product being produced.

For purposes of the present invention, it is sufficient to note that the upper ram 20 also carries a scrap cutter 21 which is bolted thereto as at 22 and, of course, as the ram 20 reciprocates toward and away from the base 10, the cutter 21 will advance toward and away from the base 10 as well.

The base 10 has a complementary scrap cutter 11 bolted to the base by bolt 12 and, as can be seen in FIG. 1 of the drawings, the cutting edge 21a of the upper cutter 21 will coact with the cutting edge 11a of the lower cutter 11 to sever any scrap which has moved through the press in the direction of the arrow 100.

Disposed beneath and in opposed relationship to the upper cutter 21 is a backup member 40 which is received in a bore 13 in the base 10. Member 40 is an elongate member having an elongate body 41 and an enlarged lower end 42. A backup block 43 is secured to the upper end of the body 41 by bolt 43a, and a spring 44 supports the enlarged end 42 which is received in an enlarged counterbore 14 of base 10. A lubricating bore 15 is also provided so as to enable the bores within which the backup member 40 moves to be lubricated.

An exit plate 50 is also mounted on the base 10 by bolts 51,51 and, assuming the scrap to be moving in the direction of the arrow 100, the scrap will slide across the top surface of the exit plate 50 and be guided over the top surface of the lower cutter 11 by backup block 43 and be severed between cutting edges 21a and 11a as the upper ram 20 comes down, depressing backup block 43 in the process.

In normal operation of the prior art illustrated in FIG. 1, the spring 44 will normally urge the backup member 40 to the up position so that the top of the block 43 will lie generally in the plane of the top of the cutter 11 and exit plate 50. Upward movement of the backup member 40 is restricted by the enlarged head 42, engaging the undersurface of the counterbore 14.

As the ram 20 advances toward the base 10, the cutters 21 and 11 will cooperate to sever the scrap which will then exit, continuing in the direction of the arrow 100. This movement of the ram 20 will also depress the backup member 40 against the force of the spring 44 and, as the ram 20 then withdraws, the spring will slam the backup member 40 back to its upper position.

There are a number of difficulties encountered with this operation and this structure.

For example, the backup member 40 is susceptible to damage in a number of ways. For one thing, as the spring 44 returns it to its upper position, the enlarged head 42 tends to slam into the top wall 14a of the counterbore 14, thereby placing considerable stress on that part of the backup member. For another thing, there is a tendency for the pieces to gall in the bore 13 as the body 41 of the backup member 40 reciprocates therein. This requires boring out the base 10, as at 15, to provide lubrication to avoid this. Finally, due to the considerable repetitive forces encountered as the ram 20 descends for literally millions of cycles, there is a tendency to break off the head of the bolt 43a. When any of these circumstances occur which require replacement of the backup member or the bolt or repair thereof, it is necessary to virtually disassemble this portion of the press. This obviously causes downtime which is expensive, labor which is expensive and part replacement which is expensive.

Figure 2:
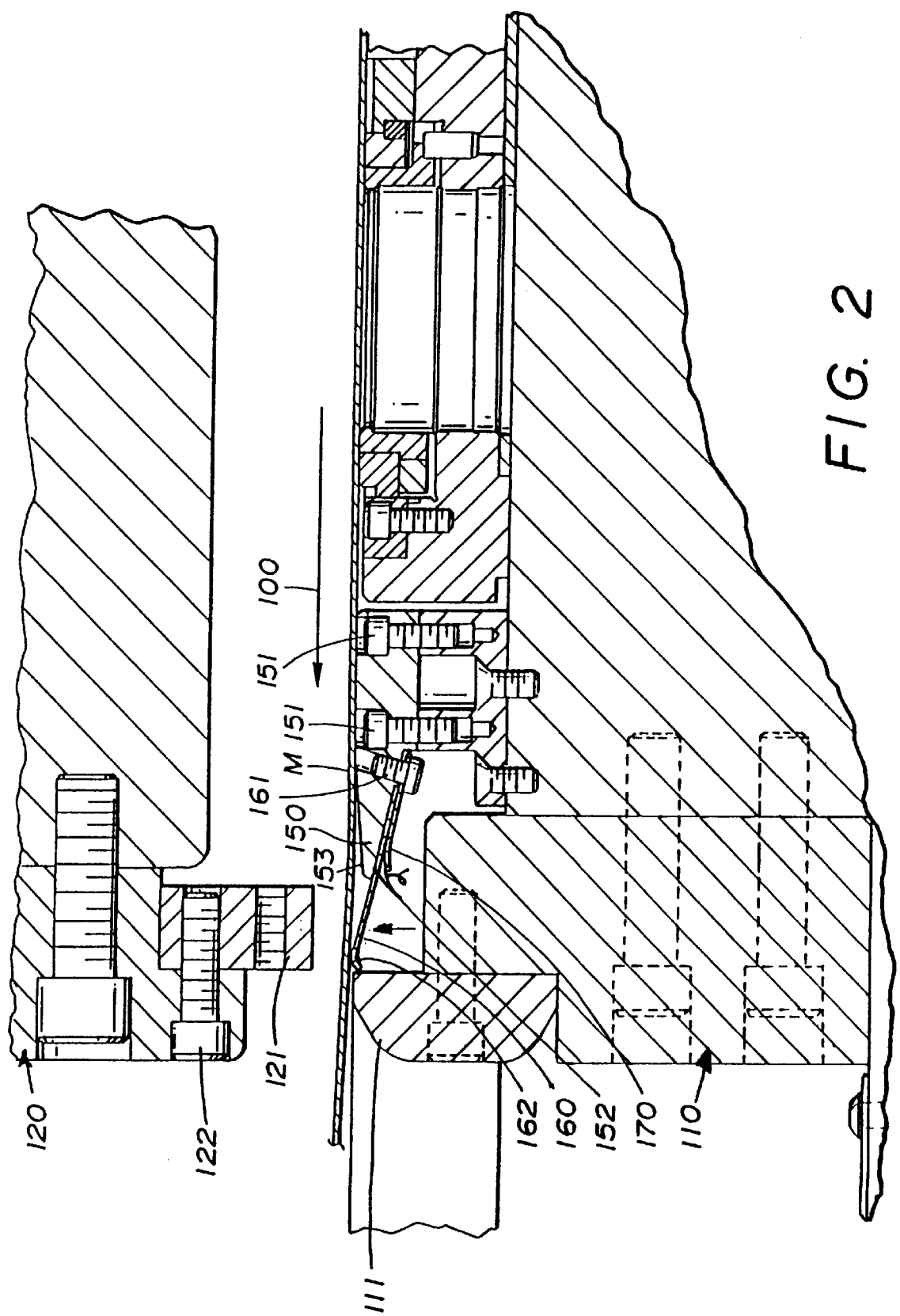
FIG. 2 is a view similar to FIG. 1 showing the scrap cutter assembly of the present invention during the cutting operation.

Referring then to FIG. 2 of the drawings in which like numbers will be utilized to designate similar components, it will be noted that the upper ram 120 again carries a upper cutter 121 secured to the ram 120 by the bolt 122. Again, the upper ram 120 reciprocates toward and away from the base 110 which carries the improved scrap cutter assembly. The base 110 also has a lower cutter 111 which cooperates with the upper cutter 121 in the fashion just described with respect to the prior art.

However, the exit plate 150, which is again secured to the base by the bolts 151,151, has a modified configuration including a tapered bottom surface 152.

To that bottom surface 152 is secured a shutter spring 160 by the bolt 161. The shutter spring 160 is a flat, elongate member which, when secured to the base 110, extends and lies along the tapered bottom wall 152 of the exit plate 150 and, when the upper ram 120 is in the up or retracted position, assumes the position shown in FIG. 3 of the drawings such that its extended end 162 extends slightly above the edge of the lower cutter 11 and the top surface 153 of the exit plate 150. It will also be noted that the end of the shutter spring 160 is arcuate so as to form a down-turned lip 162.

Also mounted on the base 1 10 is a backing spring 170. The backing spring 170 may be secured to the exit plate 150 by the bolt 161, as shown in the drawings, and serves to support the shutter spring 160 during its deflected state by providing a smooth, relatively large radius and also to assist in returning it to its FIG. 2 position.

In the improved assembly of the present invention then, as the material M moves across the press surface in the direction of the arrow 100, with the ram 120 in the up position, it will be seen that this material is supported on the extended end 162 of the shutter spring 160. It is important that the skeleton be supported as it nears the exit point so as to avoid jamming against the lower cutter 111. Inasmuch as the lip 162 is elevated, as shown in FIG. 2, this possibility is obviated.

Figure 3:
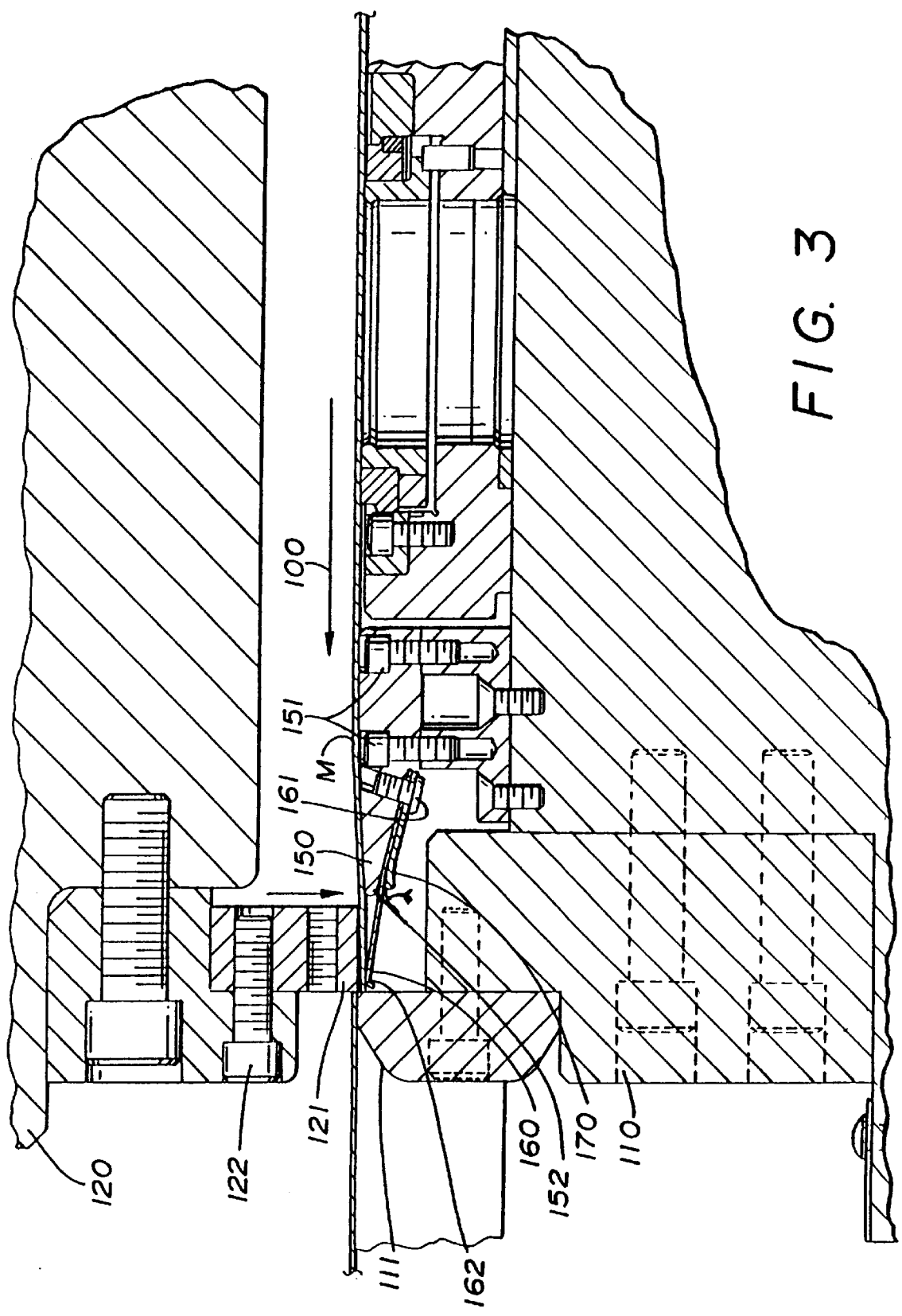
FIG. 3 is a view similar to FIG. 2 showing the scrap cutter assembly of the present invention prior to actuation of the cutter.

As the upper ram 120 moves from the position of FIG. 2 to the position of FIG. 3, the upper cutter 121 and the lower cutter 111 cooperate to sever a portion of the material M. The upper cutter 121, which contacts the material M, deflects the shutter spring 160, as shown in FIG. 2 of the drawings. As the ram 120 retracts, this shutter spring, of course, returns to the position of FIG. 3 due to its natural resiliency.

Should there be a failure of the shutter spring 160 or the backup spring 170, it is a simple matter to unbolt it and replace it. Furthermore, no modification whatsoever is required of the press base 110 because no lubrication is required. Additionally, this support of the material M avoids any shimmying or shaking of the scrap material, keeping in mind that it is truly a "skeleton" piece of material moving across the press at a very high speed with the press often operating in excess of 400 strokes per minute. This insures a much more accurate severing by the cutters 121 and 111 and minimizes any jamming of the skeleton within the press.

While a full and complete description of the invention has been set forth in accordance with the dictates of the patent statutes, it should be understood that modifications can be resorted to without departing from the spirit hereof or the scope of the appended claims.

What is claimed is:

1. A scrap cutter assembly for facilitating the severing of material passing through a reciprocating press which has a cutter attached to a reciprocating ram movable toward and away from a fixed base, comprising:

(a) an exit plate attached to the base;
(b) an elongate shutter spring having
   (1) a first end removably attached to the lower surface of said exit plate, and
   (2) a second end projecting beyond said exit plate and normally terminating above the top surface of said exit plate; and
(c) an elongate backing spring
   (1) removably attached to said exit plate and
   (2) underlying said shutter spring for at least a portion of its length.

2. The assembly of claim 1 wherein said second end of said elongate shutter spring terminates in an arcuate lip.

3. The assembly of claim 1 wherein said exit plate has a bottom surface which tapers upwardly toward the reciprocating ram; and said elongate shutter spring is juxtaposed on said tapered surface.

4. The assembly of claim 1 wherein said elongate shutter spring has a length greater than the length of said elongate backing spring.

* * * * *

UNITED STATES PATENT AND TRADEMARK OFFICE
CERTIFICATE OF CORRECTION

PATENT NO.    : 6,035,752
DATED         : March 14, 2000
INVENTOR(S)   : David E. Harhay et al.

It is certified that error appears in the above-identified patent and that said Letters Patent is hereby corrected as shown below:

<u>Title page,</u>
Item [73], Assignee, delete "Akron Steel Fabricators Co., Inc., Akron, Ohio" and insert -- Redicon Corporation, Canton, Ohio --.

Signed and Sealed this

Sixteenth Day of March, 2004

JON W. DUDAS
*Acting Director of the United States Patent and Trademark Office*